Patented Oct. 25, 1949

2,485,662

UNITED STATES PATENT OFFICE 2,485,662

ALPHA-(AMINOALKYL)-STILBENES

Ewald Rohrmann, Indianapolis, Ind., assignor to Eli Lilly and Company, Indianapolis, Ind., a corporation of Indiana No Drawing. Application April 13, 1948,
Serial No. 20,831

7 Claims. (Cl. 260—293)

My invention relates to novel organic compounds and more particularly to substituted stilbenes and their acid addition salts.

The bases of the stilbene compounds of my invention may be represented by the formula

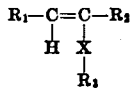

wherein $R_1$ and $R_2$ represent monocyclic aromatic radicals of the group constituting of phenyl, hydroxyphenyl, lower alkoxyphenyl, lower alkylphenyl and halophenyl, X represents an ethylene, a methylethylene or a n-propylene radical and $R_3$ represents a dimethylamino, diethylamino, methylethylamino, methylpropylamino, piperidino, pyrrolidino or a morpholino group.

Illustrative examples of stilbene compounds within the scope of my invention include the following compounds:

α-(2-dimethylaminoethyl)-4'-hydroxystilbene, which may be represented by the formula

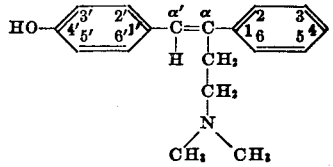

α-(2-piperidinoethyl)-stilbene hydrochloride, which may be represented by the formula

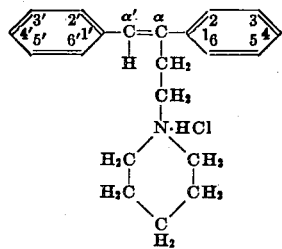

α-(2-methyl-2-diethylaminoethyl)-4'-isopropyl stilbene hydrobromide, which may be represented by the formula

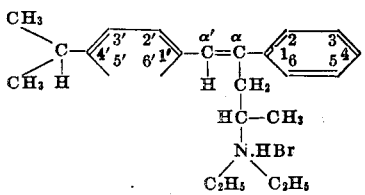

Additional examples of stilbene compounds are α-(2-piperidinoethyl)-4-methoxystilbene, α-(2-morpholinoethyl)-stilbene, α-(2-methylamino-ethyl)-stilbene, α-(2-piperidinoethyl)-4-chlorostilbene, α-(2-piperidinoethyl-4'-chlorostilbene, α-(2-ethylaminoethyl)-stilbene, α-(2-piperidinoethyl)-4-methylstilbene, α-(2-methylpropyl-aminoethyl)-stilbene, α-(2-piperidinoethyl)-2'-chlorostilbene, α-(2-piperidinoethyl)-3'-methylstilbene, α-(2-piperidinoethyl)-4'-isopropylstilbene, α-(2-piperidinoethyl)-2'-methylstilbene, α-(2-piperidinoethyl)-4'-methylstilbene, α-methylaminoethylstilbene, α-(3-dimethylaminopropyl)-4'-bromostilbene, and α-(2-piperidinopropyl)-2-butylstilbene.

The bases of my novel stilbene compounds are colorless, low-melting solids or oils, and are soluble in the common organic solvents and insoluble in water. Because of the basic group contained in the novel compounds, acid addition salts may be formed with acids. Thus, salts of the bases may be formed from mineral acids, such as hydrochloric, hydrobromic, phosphoric and sulfuric acids, and such salts exhibit water solubility. Likewise, salts of the bases may be formed from organic acids, such as acetic, maleic, cinnamic, stearic and oleic acids. Salts prepared from organic acids having a relatively great number of carbon atoms, for example oleic acid, are characterized by a slight water-solubility and an appreciable solubility in oils.

The novel compounds of my invention exhibit activity as antihistaminic agents.

The preparation of the novel compounds of my invention is accomplished in the following manner: Broadly speaking, three steps are involved. First, an aminoketone is prepared by the Mannich reaction by interreacting formaldehyde, an acylalkyl ketone wherein the acyl radical corresponds to the $R_2$ substituent desired in the final compound, and an amine having a radical corresponding to the $R_3$ substituent. Second, the aminoketone is converted to a carbinol by treating it with a Grignard reagent formed from a benzyl halide wherein the phenyl group in the benzyl halide corresponds to the desired $R_1$ substituent. Finally, the carbinol is converted to an acid addition salt of the substituted stilbene by means of a dehydrating agent such as concentrated hydrochloric acid or other acidic dehydrating agent, for example, hydrobromic acid, phosphorus tribromide, phosphorus oxychloride, and the like. The acid addition salt may be converted to the free base by known methods, e. g. treatment with alkali.

By way of illustration of the above-described process, the chemical transformations which take place in the production of α-(2-piperidinoethyl)-4-methoxystilbene hydrochloride and its free base are represented by the following equations. These equations typify the general course of the reactions involved in the production of the stilbene compounds of this invention.

the compounds correspond to the general formula set out at the head of the table and the various substituents are indicated in the columns under the respective headings. The melting points and

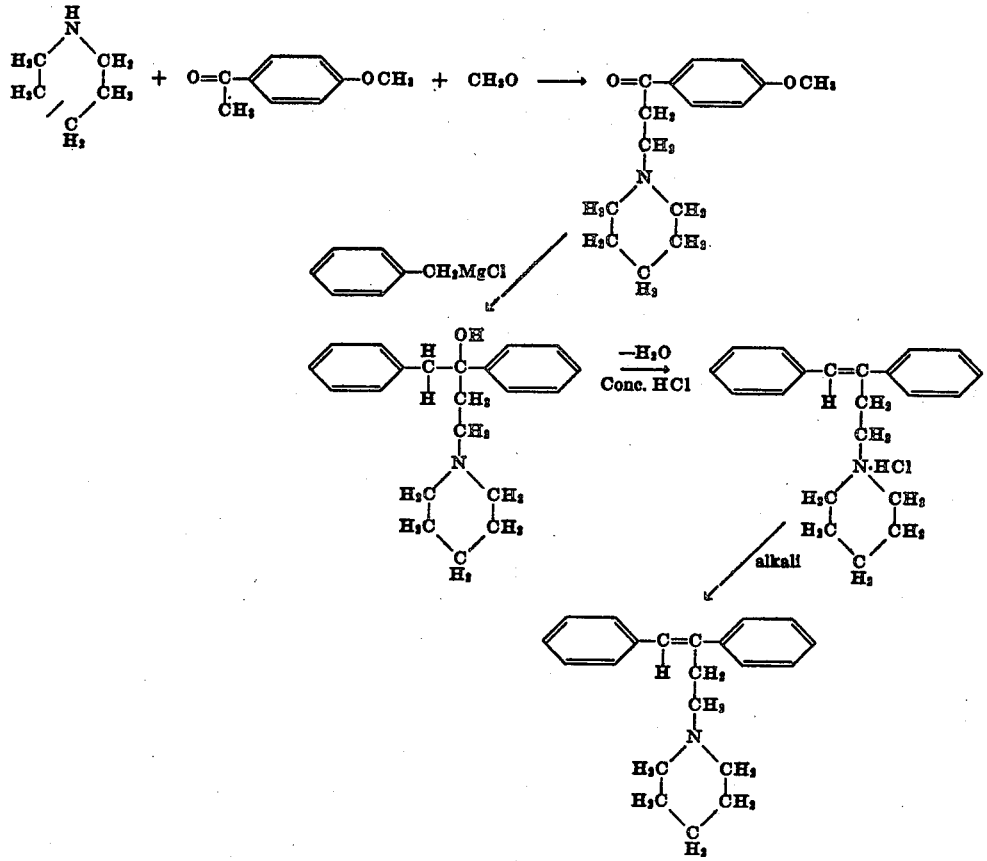

Substituted stilbenes prepared by the methods described are illustrated in Table I. In the table, analytic results given in the table are for the salt or base as indicated.

TABLE I

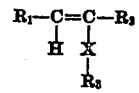

$R_1-C=C-R_2$
$\phantom{R_1-}H \phantom{=}X$
$\phantom{R_1-C=C-}R_3$

| $R_1$ | $R_2$ | X | $R_3$ | M. P. of Salt | Analysis Per Cent N in Dried Sample | |
|---|---|---|---|---|---|---|
| | | | | | Calc'd | Found |
| ⌬— | ⌬— | —(CH₂)₂— | —N(CH₂—CH₂)₂CH₂ (piperidyl, 4-methyl) | 240–244° C., HCl | 4.23 | 4.16 |
| ⌬— | CH₃O—⌬— | ....do...... | —N(CH₂—CH₂)₂CH₂ | 234–235° C., HCl | 4.17 | 4.56 |
| ⌬— | ⌬— | ....do...... | —N(CH₂—CH₂)₂O (morpholino) | 239–241° C., HCl | 4.24 | 4.43 |
| ⌬— | Cl—⌬— | ....do...... | —N(CH₂—CH₂)₂CH₂ | 207–208° C., HBr | 3.44 | 3.88 |
| Cl—⌬— | ⌬— | ....do...... | —N(CH₂—CH₂)₂CH₂ | 207–208.5° C., HBr | 3.44 | 3.68 |

| R₁ | R₂ | X | R₃ | M. P. of Salt | Analysis Per Cent N in Dried Sample | |
|---|---|---|---|---|---|---|
| | | | | | Calc'd | Found |
|  |  | —(CH₂)₂— |  | oil free base | 4.77 | 3.99 |
|  |  | ...do... |  | 240° C., HCl | 4.10 | 4.08 |
|  |  | ...do... |  | 167–168° C., HBr | 3.89 | 3.91 |
|  |  | ...do... |  | 224–225° C., HBr | 3.36 | 3.35 |
|  | 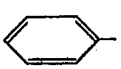 | ...do... |  | 183–184° C., HBr | 3.63 | 4.25 |
| 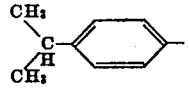 |  | ...do... |  | 207–208° C., HBr | 3.38 | 3.28 |
| 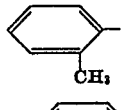 |  | ...do... |  | 208–209° C., HBr | C=68.38 H=6.98 | C=68.38 H=7.24 |
| 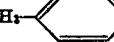 |  | ...do... |  | 209–210° C., HBr | 3.63 | 3.61 |

The following examples illustrate with greater particularity the preparation of the compounds of my invention.

Example 1

Preparation of α-(2-piperidinoethyl)-stilbene hydrochloride.

Phenyl-(β-piperidino)-ethyl ketone hydrochloride is prepared according to the method of Mannich and Lammering, Ber. 55, 3510, 1923, by refluxing for one hour a mixture of 122 g. (1 mol) of piperidine hydrochloride, 45 g. (1.5 mols) of paraformaldehyde, 2.5 cc. of 12N hydrochloric acid, 300 cc. of absolute ethanol and 120 g. (1 mol) of acetophenone. 30 g. (1 mol) of paraformaldehyde are then added and refluxing is continued for 2 hours. To the hot mixture are added 250 cc. of boiling acetone, and the resulting solution is allowed to cool slowly and finally is cooled in an ice bath, whereupon a while crystalline precipitate of phenyl-β-piperidinoethyl ketone hydrochloride forms. The precipitate is filtered off and recrystallized by dissolving it in a minimum amount of hot ethanol, diluting the ethanol solution with several volumes of boiling acetone, and cooling. Phenyl-β-piperidinoethyl ketone hydrochloride melting at about 192–193° C. is thus obtained. The free base is prepared from the salt by dissolving the phenyl-β-piperidinoethyl ketone hydrochloride in water, adding concentrated sodium hydroxide solution until alkaline, and extracting the phenyl-β-piperidino ketone with ether. The ether extract is dried over anhydrous magnesium sulfate and potassium carbonate. The resulting anhydrous ether solution of phenyl-β-piperidinoethyl ketone can be used directly for subsequent operations, or if desired, can be distilled in vacuo to yield the free base as an oil.

α-Phenyl-α-(2-piperidinoethyl)-β-phenylethanol hydrochloride is prepared from the phenyl β-piperidinoethyl ketone as follows:

A Grignard reagent is prepared from 17 g. (0.7 mol) of magnesium and 90 g. (0.7 mol) of benzyl chloride in 500 cc. of anhydrous ether. To this reagent are slowly added with stirring 200 cc. of dry ether containing 69 g. (0.32 mol) of phenyl β-piperidinoethyl ketone. After stirring for 2 hours the mixture is treated with 170 cc. of concentrated hydrochloric acid and 100 g. of ice. A white solid comprising α-phenyl-α-(2-piperidinoethyl)-β-phenylethanol hydrochloride separates and is filtered off. The solid is washed with a small amount of ice water and recrystallized from aqueous acetone. α-Phenyl-α-(2-piperidinoethyl)-β-phenylethanol hydrochloride thus prepared crystallized as white needles which melted at about 234–237° C. Analysis showed the presence of 4.09 percent nitrogen as compared with the calculated value of 4.06 percent.

α-(2-piperidinoethyl)-stilbene is prepared by the dehydration of α-phenyl-α-(2-piperidinoethyl)-β-phenylethanol hydrochloride with hydrochloric acid as follows:

170 g. (0.5 mol) of α-phenyl-α-(2-piperidinoethyl)-β-phenylethanol hydrochloride are refluxed for 2 hours with 825 cc. (10 mols) of 12N hydrochloric acid. On cooling to room temperature α-(2-piperidinoethyl)-stilbene hydrochloride crystallizes out and is filtered off, washed with acetone and anhydrous ether. The filtrate is concentrated to about 500 cc. in vacuo and 350 cc. of 12N hydrochloric acid are added and the solution refluxed 2 hours. Upon cooling, an additional amount of α-(2-piperidinoethyl)-stilbene hydrochloride separates as an oil. The oil is removed and treated with acetone, whereupon the α-(2-piperidinoethyl)-stilbene crystallizes. A repetition of the concentration of the filtrate and addition of more acid and refluxing yields an additional amount of the desired product. The precipitates are combined and recrystallized from boiling absolute ethanol, yielding α-(2-piperidinoethyl)-stilbene hydrochloride which melts with decomposition at about 243-244° C.

α-(2-piperidinoethyl)-stilbene hydrochloride may also be prepared by dehydration of α-phenyl-α-(2-piperidinoethyl)-β-phenylethanol hydrochloride with phosphorus tribromide as follows:

60 g. (0.2 mol) of α-phenyl-α-(2-piperidinoethyl)-β-phenylethanol hydrochloride are suspended in 500 cc. of chloroform and 70 cc. (200 g., 0.75 mol) of phosphorus tribromide are added. After 10 minutes the hydrochloride salt is dissolved, forming a clear solution which is allowed to stand at room temperature for about 8 hours. The chloroform is then removed by evaporation on a steam bath and the residue is dissolved in 200 cc. of water. The water solution is made strongly alkaline with sodium hydroxide and extracted 3 times with 100 cc. portions of acetone-ether mixture (1:20). The cooled ether solution is treated with dry hydrogen chloride, whereupon white crystals of α-(2-piperidinoethyl)-stilbene hydrochloride separate. The crystals are filtered off and recrystallized from ethanol-ether solution yielding α-(2-piperidinoethyl)-stilbene hydrochloride which melts with decomposition at about 243-244° C.

α-(2-piperidinoethyl)-stilbene is prepared from its hydrochloride salt by dissolving the hydrochloride salt in about 10 times its amount of water and making the solution alkaline with sodium hydroxide solution. The α-(2-piperidinoethyl)-stilbene which separates as an oil is extracted with ether, the ether solution dried and the α-(2-piperidinoethyl)-stilbene is isolated by evaporation of the ether in vacuo.

*Example 2*

Preparation of α-(2-piperidinoethyl)-4-methoxystilbene hydrochloride.

85 g. of p-methoxyphenyl-β-piperidinoethyl ketone (prepared according to the method of Mannich and Lammering as set forth in Example 1) are dissolved in 200 cc. of water, the solution is made strongly alkaline with sodium hydroxide and extracted three times with 200 cc. of ether. The combined ether extracts containing the p-methoxyphenyl-β-piperidinoethyl ketone base are dried with anhydrous magnesium sulfate, and added to a Grignard reagent prepared from 17 g. of magnesium and 20 g. of benzyl chloride in 500 cc. of anhydrous ether. The mixture is stirred for about 2 hours at room temperature and is poured into a mixture of 170 cc. of 12N hydrochloric acid and 150 g. of ice whereupon a white precipitate of α-p-methoxyphenyl-α-(2-piperidinoethyl)-β-phenylethanol hydrochloride forms. The precipitate is filtered off and recrystallized from ether-alcohol whereupon it melts at about 235-237° C. (dec.).

The α-p-methoxyphenyl-α-(2-piperidinoethyl)-β-phenylethanol hydrochloride so prepared is dehydrated with hydrochloric acid according to the procedure set forth in Example 1. α-(2-piperidinoethyl)-4-methoxystilbene hydrochloride melts at about 234-235° C.

α-(2-piperidinoethyl)-4-methoxystilbene may be obtained from its corresponding hydrochloride salt by the procedure described in Example 1.

*Example 3*

Preparation of α-(2-piperidinoethyl)-4-chlorostilbene hydrobromide.

A mixture of 78 g. of p-chloroacetophenone, 60 g. of piperidine hydrochloride, 2 cc. of 12N hydrochloric acid, 22.5 g. of paraformaldehyde and 150 cc. of absolute alcohol is refluxed for one hour. 15 g. of paraformaldehyde are added and refluxing is continued for two hours. The mixture is then poured into 1200 cc. of hot acetone. The acetone solution is cooled to about 0° C. and the ω-piperidino-p-chloropropriophenone hydrochloride which separates in crystalline form is filtered off. The crystals melt at about 190-193° C.

69 g. of ω-piperidino-p-chloropropriophenone base dissolved in 300 cc. of anhydrous ether are added to a Grignard reagent prepared from 17 g. of magnesium and 90 g. of benzyl chloride in 500 cc. of anhydrous ether. The mixture is stirred for two hours at room temperature and is then poured into a mixture of 180 cc. of 12N hydrochloric acid and 100 g. of ice. The white precipitate of α-p-chlorophenyl-α-(2-piperidinoethyl)-β-phenylethanol hydrochloride which forms is filtered off. After recrystallization from ether-alcohol mixture it melts at about 246-248° C.

The α-p-chlorophenyl-α-(2-piperidinoethyl)-β-phenylethanol hydrochloride is dehydrated with phosphorus tribromide by the method set forth in Example 1. 25 g. of the carbinol and 57 g. of phosphorus tribromide, dissolved in 200 cc. of chloroform, are allowed to stand for about 8 hours. Most of the chloroform is then removed by evaporation in vacuo and the residue is taken up in an excess of absolute ethanol. The solution is poured into 200 cc. of water, the mixture made strongly alkaline with sodium hydroxide and extracted three times with 150 cc. portions of ether. The combined ether extracts are dried over magnesium sulfate and the ether is removed by evaporation in vacuo. The resulting residue is dissolved in a mixture of 500 cc. of 1:1 absolute ethanol-acetone containing 20 cc. of 48 percent hydrobromic acid. Ether is added to the solution to incipient crystallization and the solution is then cooled, substantially completing the crystallization of α-(2-piperidinoethyl)-4-chlorostilbene hydrobromide. The crystals are filtered off and purified by precipitation from ethanol solution by the addition of ether. α-(2-piperidinoethyl)-4-chlorostilbene hydrobromide melts at 207-208.5° C.

α-(2-piperidinoethyl)-4-chlorostilbene may be prepared from its hydrobromide salt by the procedure described in Example 1.

*Example 4*

Preparation of α-(2-morpholinoethyl)-stilbene hydrochloride.

69 g. of β-morpholinoethylphenyl ketone, prepared by the method of Chi and Lee, Trans. Science Soc China, 8: 87-89, 1934, are dissolved in anhydrous ether, and reacted with a Grignard reagent prepared from 1.7 g. of magnesium and 80 g. of benzyl chloride according to the method set forth in Example 1. α-Phenyl-α-(2-morpholinoethyl)-β-phenylethanol hydrochloride thus prepared melts at about 240-241° C. Analysis showed the presence of 4.73 percent nitrogen as compared with the calculated value of 4.25 percent.

The α-phenyl-α-(2-morpholinoethyl)-β-phenylethanol hydrochloride is dehydrated with phosphorus tribromide according to the process described in Example 1. White crystals of α-(2-morpholinoethyl)-stilbene hydrochloride, melting at about 239–241° C. are obtained.

α-(2-morpholinoethyl)-stilbene may be prepared from its hydrochloride salt by the procedure described in Example 1.

*Example 5*

Preparation of α-(2-piperidinoethyl)-4'-methylstilbene hydrobromide.

69 g. of phenyl-(β-piperidino)-ethyl ketone, prepared by the method of Example 1, are dissolved in 300 cc. of anhydrous ether and the solution is added to a Grignard reagent prepared from 17 g. of magnesium and 101 g. of p-xylyl chloride and 500 cc. of anhydrous ether. The mixture is stirred for two hours at room temperature and then poured into a mixture of 170 cc. of 12N hydrochloric acid and 100 g. of ice. The precipitate of α-phenyl-α-(2-piperidinoethyl)-β-xylylethanol hydrochloride which forms is filtered off. Upon recrystallization from ether-alcohol solution it melts at about 248° C. (dec.). The dehydration of α-phenyl-α-(2-piperidinoethyl)-β-xylylethanol hydrochloride is accomplished with phosphorus tribromide by the method set forth in Example 1. α-(2-piperidinoethyl)-4'-methylstilbene hydrobromide is prepared by treating an ethereal solution of α-(2-piperidinoethyl)-4'-methylstilbene with anhydrous hydrogen bromide and upon recrystallization from ether-alcohol the hydrobromide salt melts at about 209–210° C.

*Example 6*

α-[2 - (methyl-n-propylamino) - ethyl]-stilbene hydrobromide.

The procedure of Example 1 is repeated using 83 g. of methyl-n-propylamine, 2 cc. of 12N hydrochloric acid, 34 g. of paraformaldehyde, 90 g. of acetophenone and 210 cc. of absolute ethanol, with subsequent addition of 23 g. of paraformaldehyde. The resulting phenyl-2-(methyl-n-propylamino)-ethyl ketone hydrochloride is recrystallized from ether-alcohol solution whereupon it melts at 148–149° C.

A solution of 72.5 g. of phenyl-2-(methyl-n-propylamino)-ethyl ketone in 300 cc. of anhydrous ether is reacted with a Grignard reagent prepared from 17 g. of magnesium, 90 g. of benzyl chloride and 500 cc. of anhydrous ether, according to the method described in Example 1. The α-phenyl-α - (2-methyl-n-propylamino-ethyl) - β-phenylethanol hydrochloride thus prepared melts at 94–95° C. Analysis showed the presence of 4.22 percent nitrogen as compared with the calculated value of 4.19 percent.

The dehydration of α-phenyl-α-(2-methyl-n-propylamino-ethyl)-β-phenylethanol hydrochloride is effected by the use of phosphorus tribromide by the procedure described in Example 1. The α-[2-(methyl-n-propylamino) - ethyl]-stilbene so produced is precipitated from anhydrous ether solution with hydrogen bromide yielding α - [2 - (methyl-n-propylamino)-ethyl] - stilbene hydrobromide. After recrystallization from ether-alcohol the hydrobromide salt melts at 167–168° C.

I claim:

1. A compound selected from the group consisting of substituted stilbenes and their acid addition salts, said stilbenes being represented by the formula

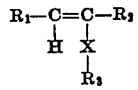

wherein $R_1$ and $R_2$ are carbocyclic radicals of the group consisting of phenyl, hydroxyphenyl, lower alkoxyphenyl, lower alkylphenyl and halophenyl, X is a radical of the group consisting of ethylene, methylethylene and n-propylene, and $R_3$ is a radical of the group consisting of dimethylamino, diethylamino, methylethylamino, methylpropylamino, piperidino, pyrrolidino and morpholino.

2. α-(2-piperidinoethyl) - stilbene represented by the formula

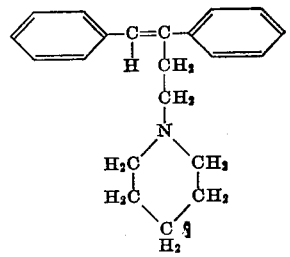

and acid addition salts thereof.

3. α-(2-piperidinoethyl)-stilbene.

4. α-(2-piperidinoethyl) - 4 - methoxystilbene represented by the formula

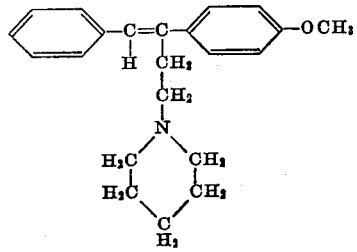

and acid addition salts thereof.

5. α-(2-piperidinoethyl)-4-methoxystilbene.

6. α-(2-piperidinoethyl)-4 - chlorostilbene represented by the formula

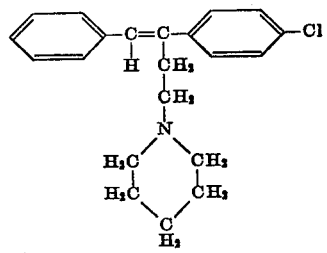

and acid addition salts thereof.

7. α-(2-piperidinoethyl)-4-chlorostilbene.

EWALD ROHRMANN.

REFERENCES CITED

The following references are of record in the file of this patent:

UNITED STATES PATENTS

| Number | Name | Date |
|---|---|---|
| 2,128,945 | Jones | Sept. 6, 1938 |
| 2,415,020 | Morey | Jan. 28, 1947 |

FOREIGN PATENTS

| Number | Country | Date |
|---|---|---|
| 398,011 | Germany | July 4, 1924 |
| 60,391 | Denmark | Jan. 20, 1939 |